United States Patent
Marocco

(10) Patent No.: US 6,843,242 B2
(45) Date of Patent: Jan. 18, 2005

(54) METHOD FOR CONSOLIDATING NATURAL STONE BLOCKS

(75) Inventor: Guiseppe Marocco, Turin (IT)

(73) Assignee: Geo S.R.L., Torinese (IT)

( * ) Notice: Subject to any disclaimer, the term of this patent is extended or adjusted under 35 U.S.C. 154(b) by 186 days.

(21) Appl. No.: 10/332,121

(22) PCT Filed: Jun. 22, 2001

(86) PCT No.: PCT/EP01/07100
§ 371 (c)(1),
(2), (4) Date: Jan. 6, 2003

(87) PCT Pub. No.: WO02/02480
PCT Pub. Date: Jan. 10, 2002

(65) Prior Publication Data
US 2003/0145841 A1 Aug. 7, 2003

(30) Foreign Application Priority Data
Jul. 6, 2000 (EP) .......................................... 008304776

(51) Int. Cl.[7] .............................................. B23B 35/00
(52) U.S. Cl. ............................... 125/1; 428/15; 125/26; 125/38; 125/39; 451/41; 264/36.2
(58) Field of Search .............................. 451/41, 39, 54, 451/58, 353, 456; 125/1, 26, 38, 39; 428/15; 264/36.2

(56) References Cited

U.S. PATENT DOCUMENTS

| 3,950,202 A | * | 4/1976 | Hodges ....................... 156/154 |
| 4,024,098 A | * | 5/1977 | Yamaguchi et al. ........ 524/811 |
| 6,475,067 B1 | * | 11/2002 | Jones et al. .................... 451/41 |
| 2004/0076771 A1 | * | 4/2004 | Marocco ...................... 428/15 |

FOREIGN PATENT DOCUMENTS

| DE | 39 30 281 | 3/1990 |
| EP | 0 192 038 | 8/1986 |
| EP | 0 344 619 | 12/1989 |
| EP | 0 962 430 | 12/1999 |

* cited by examiner

Primary Examiner—Lee D. Wilson
Assistant Examiner—Anthony Ojini
(74) Attorney, Agent, or Firm—Finnegan, Henderson, Farabow, Garrett & Dunner, L.L.P.

(57) ABSTRACT

A method is described for repairing and consolidating a natural stone block (1), with internal fractures and structural discontinuities, in which around the block (1) a coating (2, 3, 4) is applied that wraps the block (1) below and along a vertical perimeter thereof and is higher than the block (1); the coating (2, 3, 4) is spaced from the block (1) and forms the liquid- and gas-tight housing and allows the resin to flow against the block (1). The containment of hydrostatic resin pressures and the control of resin consumptions are performed by an external formwork composed of the coating (2, 3, 4) and of structures (5) to a platform (11) for supporting and transporting the block (1).

12 Claims, 2 Drawing Sheets

METHOD FOR CONSOLIDATING NATURAL STONE BLOCKS

Figure 1:
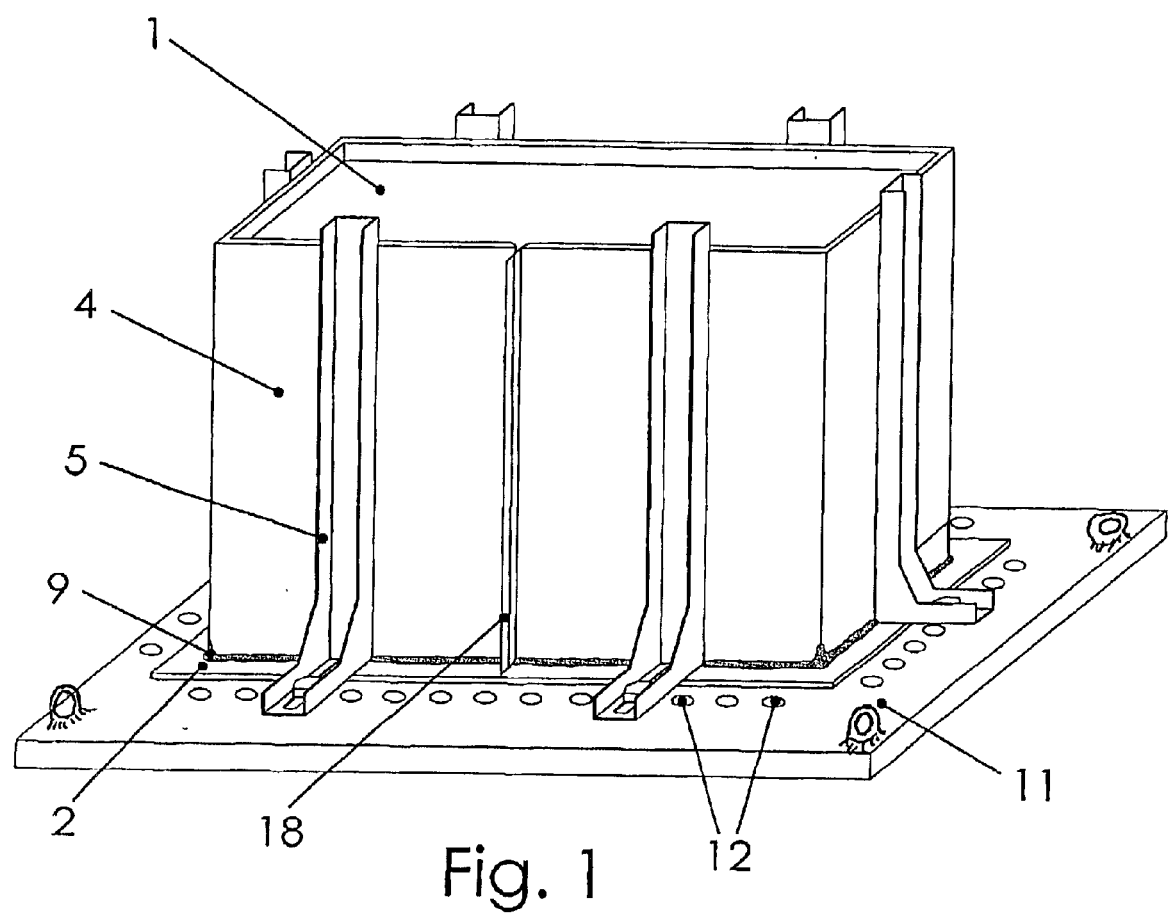

The present invention refers to a method for consolidating natural stone blocks, filling and welding with an hardening fluid resin all structural discontinuities inside the block that communicate with one of the six faces of a substantially parallelepiped block.

Natural stone blocks, such as marble, granite, onix and the like, often show structural defects that originate from their mineralogic composition and from the geologic body history and are witnesses of such problems with their structural heterogeneity.

Such raw material dishomogeneity affects the whole production cycle, from material extraction to following workings and uses.

So far, the manufacturing activities in the sector as a whole had to suit to such situation: the bodies of particularly fractured materials are not used or have been abandoned because the activity was not economically convenient, and the transforming activity is limited to use the less faulty blocks and to repair, how and when possible, faulty slabs and manufactures.

The non-constant and uncontrollable structural characteristics of the stony raw materials are the base of the difficult industrial working of the material itself and the whole sector still operates as artisans, with companies whose sizes and number of workers are small.

In order to correct the raw material and take it to assume more structurally homogeneous characteristics, several attempts have been made to consolidate the blocks and increase their useful yields: the most interesting attempts are those that try to consolidate the blocks by inserting hardening resins, in a vacuum state, inside the internal fractures.

In order to do this, it is necessary to constrain the block into a solid metallic airtight vessel that accurately contains it on five faces, leaving the upper face free, leaving minimum interspaces between block and vessel in order to avoid excessive resin consumptions and that allows constraining the hydrostatic resin thrusts from inside and the rather more relevant thrusts from the outside due to pressure differences between autoclave interior that occur during the process.

Since every natural stone has a different and unique size, such metallic formworks should be designed and built with a variable geometry and this would make their manufacturing, and, still more, their use, enormously complicated.

In fact, they would have to be disassembled and reassembled at every cycle after having accurately cleaned them, checking and replacing the sealing gaskets and, at every reassembly, with the repeated difficulty of guaranteeing the perfect liquid- and gas-seal that is mandatory for the method to succeed.

Such method, that is theoretically correct, is thereby unfeasible from the practical point of view, because the tooling for building the formworks and the necessary means for handling them when assembling would be excessively costly, the management costs would be high due to the long assembly and disassembly operations for formworks components and their disassembly and cleaning at every cycle, and the result would be uncertain and risky, because upon every treatment the problems of a correct seal to liquids and gases would occur.

An attempt to simplify the method, removing the heavy metallic formworks, is disclosed in Italian Patent No. 1.027.222 that provides using a plastic flexible vessel that contains the block, outside which a mineral oil is inserted into an autoclave, the specific weight of such oil being almost equal to the one of the resins used for the method.

By modifying the oil level around the block coated with the plastic flexible sack, it is possible to accurately control the amount of resin used for the method.

The method has its limits in the fact that the oil fouls the autoclave and must be recovered at every cycle in an external vessel and all block handling manoeuvres after impregnation are conditioned by the residual oil dripping.

Moreover, since the resin hardening must be completed inside the autoclave, with the block immersed into oil, the autoclave exploitation is unsatisfactory as regards the number of possible treatments during 24 hours.

In European Patent Application No. EP 0 962 430 A1, a method is disclosed whose advantage is removing both rigid metallic formworks and the balance obtained by counteracting the operating pressures, using the block itself to hold up the hydrostatic pressures of the liquid resin inserted into the plastic vessel arranged around the block that is connected to the block through a plurality of projections glued to the block, if are part of the coating, or glued to the coating, if built-in on the block, such projections forming the system of resin flowing channels, while their measure allows controlling the resing consumption.

The plastic coating also allows transferring and supporting the block, without having to use structured and heavy metallic walls, the strong pressures from outside towards the inside occur when atmospheric pressure or stronger pressures are re-inserted into the autoclave.

The limits of such method can be identified in the high level of manual operations for coating the block, in the necessary time for the projection glueing to get the necessary mechanical values for a safe seal of the very many glueing points and for the difficulty of guaranteeing the liquid- and gas-tightness for a coating with four joints or, in case of a continuous sheet, for the difficulty of correctly glueing the angles, while the glue must be given to every projection in the correct amount and with extreme care and every sheath sliding must be avoided when the glue is still fluid not to block the resin injection channels.

The method according to the present invention, that can be advantageously used to consolidate structurally faulty blocks made of natural stone and uses a mixed technique that separates the liquid- and gas-tightness problems of the housing external to the block from those of constraining the hydrostatic thrusts without having to glue the block and the tight outside sheath and avoiding every risk of method failure due to tightness defects in the tight sheath surrounding the block on five sides thereof.

The above and other objects and advantages of the invention, as will appear from the following description, are obtained by a method for consolidating natural stone blocks as claimed in claim 1. Preferred embodiments and non-trivial variations of the present invention are claimed in the dependent claims.

Figure 2:
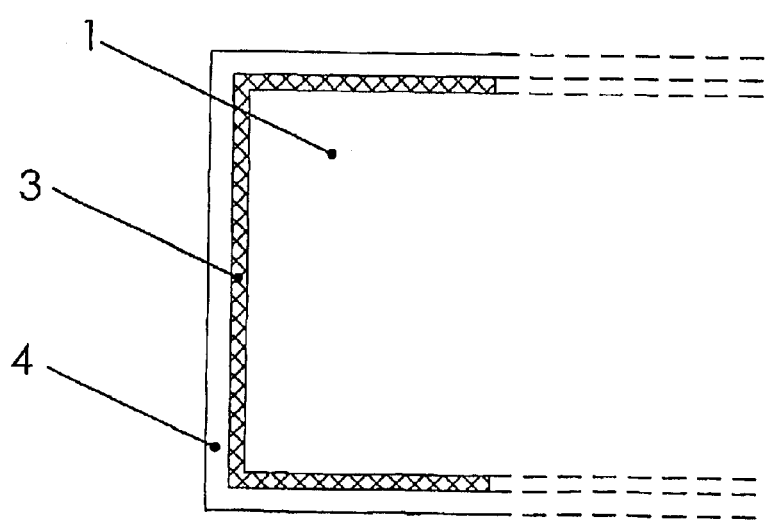
Figure 3:
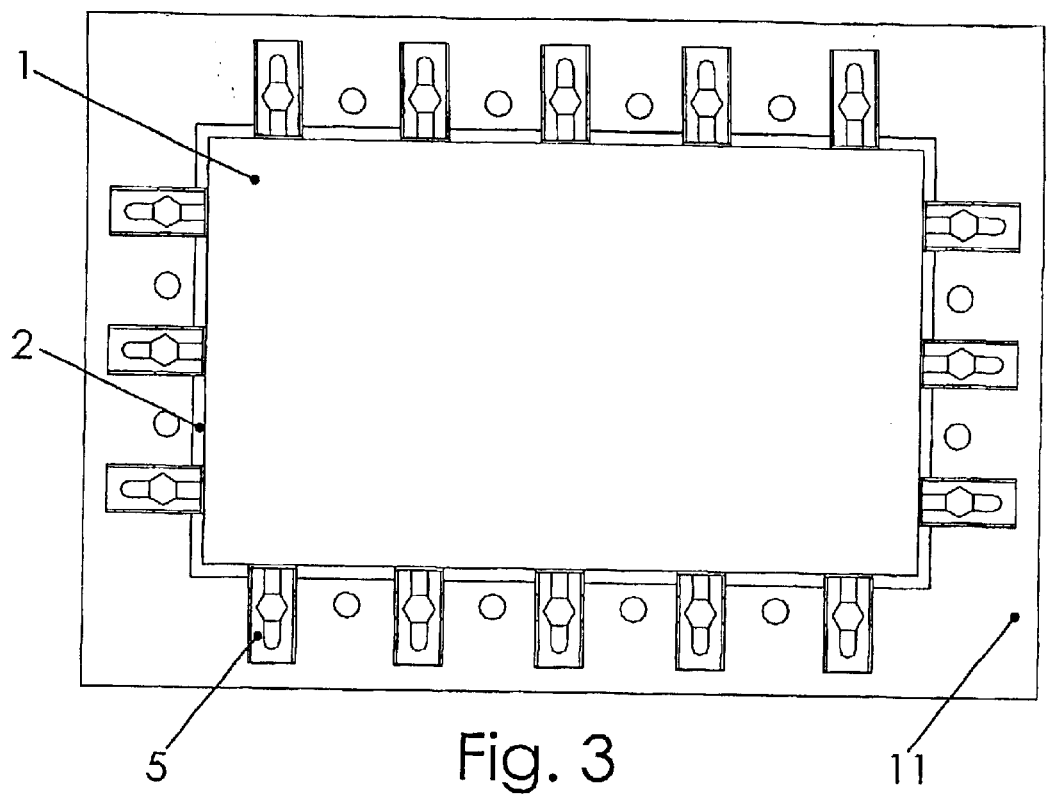
Figure 4:
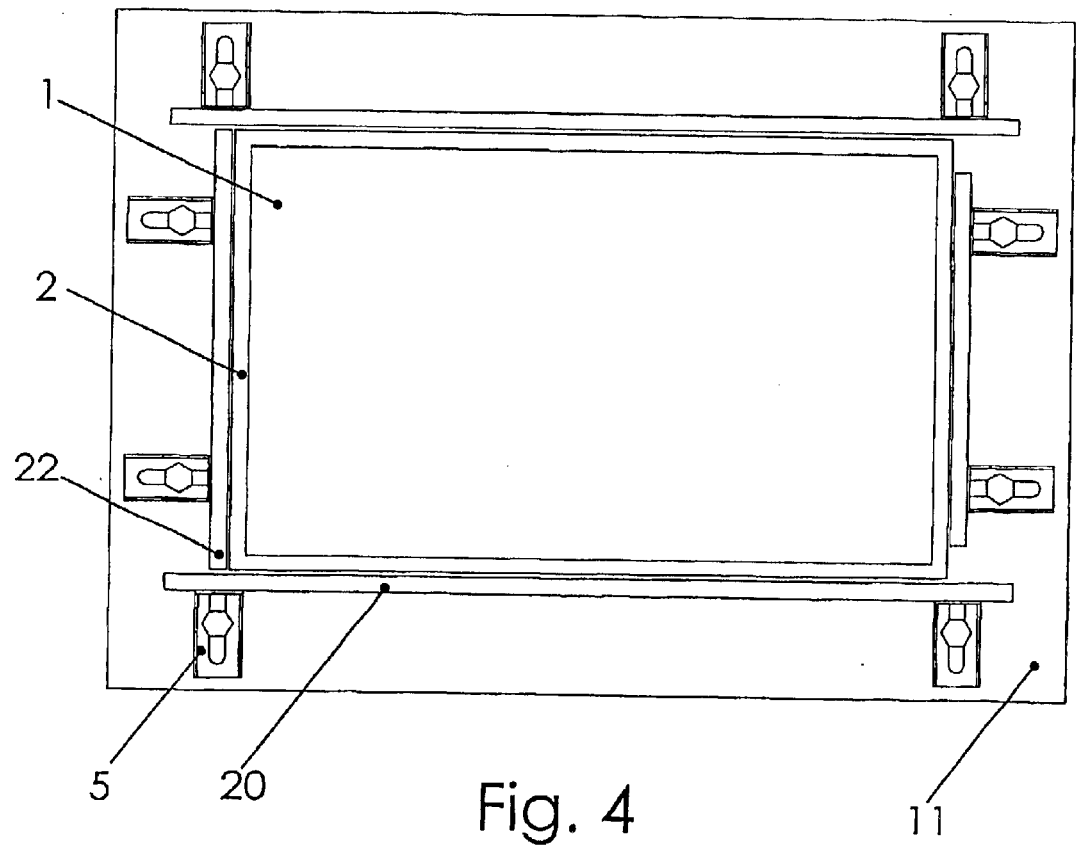

These and other objects of the invention will more clearly appear from the following description, provided with reference to the enclosed drawings of a preferred embodiment of the invention, given as a non-limiting example and in which:

FIG. 1 shows a schematic perspective view of a natural stone block that is externally coated, on the base and perimeter thereof, with sheets of liquid- and gas-tight materials, such sheets being mechanically held against the block from the weight of the block itself in the bearing area, and by sturdy and undeformable structures on the four vertical faces, that are mutually connected by a tighe seam made of structural glues, said block being thereby ready for the repair and consolidation treatment of the method of the present invention;

FIG. 2 shows the horizontal section of a block side with the sequence of materials coating it, including the fluid or hardened resin that is placed between or within said sheet materials and the block; and FIGS. 3 and 4 show drawings that are an example of two system to contain the hydrostatic thrusts, one with rigid supports placed around the block at a convenient pitch one from the other (similar to the one in FIG. 1), and the other that uses planes made of rigid and preferably lightweight material that cover the whole vertical surfaces of the two long sides of the block and substantially those of the two heads with mechanical tightening means that are strongly secured to the block bearing platform.

With reference to the Figures, a method will now be described to impregnate and consolidate a block made of natural stone, hereinbelow simply called "block".

The block 1 is initially heated till it reaches an internal temperature of 15–20° C. in order to have a thermal mass adapted to enable the perfect drying of the block in a vacuum state, without forming ice.

Such heating can be obtained through all known means, such as infrared rays lamps, electric heating plates or hot air circulating around the block.

The block is then placed on a rigid platform 11, that is also used for transporting the block 1, by interposing a base sheet 2 whose sizes exceed by a few cm the plan sizes of the block, on which discontinuous spacers (not shown) are arranged that create the distance from block 1 to said base sheet 2.

The base sheet 2 is a liquid- and gas-tight sheet also when the pressure exerted on the external sheet face is greater by a few atmospheres than the one exerted against its internal face towards the block 1, made of elastomer, plastic, metal or impregnated fibers and preferably with a smooth upper surface.

The spacers can also be of any material and must be arranged discontinuously in order to form a network of intercommunicating channels below the block 1.

It is also possible, in place of the spacers, to use a single or double sheet made of glass fibers fabric or other material, choosing the fabric in such a way that it easily allows the resin to flow therethrough or with a fabric whose weft is composed of sticks with a small diameter and whose warp is used to mutually connect said vertical sticks whose function is allowing the downwards flow of the impregnation resins from the upper surface of the block 1.

Afterwards, around the four vertical faces of the block 1 and for a height of 1–2 centimeters over the height of the block 1 that results when the block 1 is already abutted against the base sheet 2 and the spacers, the whole vertical perimeter of the block 1 is coated with a layer or a double layer of glass net 3, whose structure is such as to allow an easy resin flow therethrough or with a fabric whose weft is composed of sticks with a small diameter and whose warp is used to mutually connect said vertical sticks whose function is allowing the downwards flow of the impregnation resins from the upper surface of the block 1.

If the block 1 is impregnated in a normal position to the following sawing plane in plates through a multi-blade frame, the plates will be perimetrally reinforced by a protection belt against handling impacts, with the further advantage of not having to saw with the frame the upper resin layer in addition to the lower resin thickness between base sheet 2 and block 1: such sawing can be somewhat difficult to perform by the frames for granite and the still-existing sand frames for marble.

Afterwards, a continuous sheet 4, that is liquid- and gas-tight also whan the pressure exerted on the external sheet face is greater by a few atmospheres than the pressure exerted against the internal face thereof towards the block 1, and that is a few cm higher than the block 1 in order to form over the block 1 a containment basin for a fluid resin that will be subsequently poured onto the block 1, is coated around the perimeter of the block 1. The ends of the sheet 4, after the sheet 4 itself has been stretched in order to be perfectly stretched and to adhere to the perimeter of block 1, are joined together by welding (in 18 in FIG. 1) or by other means adapted to guarantee liquid- and gas-tightness.

The sheet 4 can be made of plastic, polypropylene, polythene, polyester, PVC, polyammide, polystyrene, aluminium or the like and must be scarcely extensible, so that, for these purposes and in order to increase the absolute liquid- and gas-tightness, composite materials can be used, employing two or more sheets 4 made mutually integral and of the same type of plastic or metal or using different plastics, as well as a composite multi-layered sheet made of metal and plastic.

To complete the sealing between vertical coating sheet 4 of block 1 and base sheet 2, in order to form a sheath that surrounds the block 1 in a liquid- and gas-tight vessel on the five faces thereof, a material seam 9 is formed, for example by hot melt, along the whole perimeter of the junction angle between vertical coating sheet 4 and base sheet 2.

Then, next to suitable single or double threaded holes 12, arranged outside the maximum area that the biggest processable block 1 can occupy, a suitable number of rigid supports 5 are placed, whose section is T- or U-shaped and whose base, at 90° and of a convenient length, is adapted to abut on the platform 11 and to be secured through slots or laterally through bolts, into the holes 12 after that the plane profile base has been pushed against the wall of block 1 already coated with the sheet 4.

The rigid supports 5 has a height that is equal to or greater than the height of block 1, are provided with a suitable undercut in order not to interfere with the perimeter connection seam 9 between base sheet 2 and vertical sheet 4 and can be made of metal or reinforced plastic.

In a different embodiment shown in FIG. 4, the securing holes for rigid supports 5 that are used to reinforce the surfaces on the long side of block 1 are placed on the longitudinal ends of the platform 11 with a center distance between the ends that exceeds by at least ten cm the maximum length of the block that can be processed and the supports 5 are used to push againt the block 1 a rigid and light plane 20 of a suitable thickness, for example a honeycomb panel made of aluminium and at least 5 or 6 cm thick, with external skins made of: impregnated fabric or an aluminium sheet or even some panels of the same material that are less thick, possibly joined together mechanically or through glueing.

In order to contain the hydrostatic pressures on block 1 headers, rigid and light paneled structures 24 are similarly used, possibly making available panels with different lengths to minimise the esternal side bands to the rigid support plane in which the resistance to hydrostatic pressures is supported only by the tight sheet 4.

The platform 11 on which the block 1 is placed is afterwards transferred in autoclave (not shown) equipped with an opening to insert the resin and, preferably, with an upper porthole to check the operations, taking care that the upper surface of the stony block 1 is in register.

The air contained in the autoclave is subsequently scavenged at the vacuum state and in this phase a quick and complete drying is obtained of the block 1 and of all internal fractures and recesses that communicate with one of the six faces of the block 1, such drying process being enabled by the preliminary heating of the block 1 and by the reduced water vapor tension that progressively decreases when the pressure in the autoclave decreases.

In order to accelerate the drying step and avoid that water contained into the block 1 has to be removed through vacuum pumps, such a procedure slowing down the method and preventing from reaching optimum vacuum levels in reasonable times, it is convenient to place autoclave, inside the autoclave, a cooling coil on which the steam being freed from the block 1 is accumulated as ice.

After having reached inside the autoclave a vacuum level that is as near as possible to zero and, in any case, not greater than 10 residual torr, the resin is progressively inserted into the autoclave being sucked by the vacuum inside the autoclave or being inserted into the autoclave by a pump and then being poured on the upper uncovered surface of the block 1 until a predefined and sufficient liquid head is obtained for filling all internal defects of the block 1.

Alternatively, the resin, having been previously degassed, is inserted at the base of block 1 and made rise towards the surface to enable the residual air contained in block 1 to flow out, always taking care of forming the suitable liquid head on the surface of block 1.

This excess amount is computed from experience on a statistical basis, taking into account the type of stone to be consolidated and always, anyway, slightly in excess to avoid that an uncovered crack allows the air to seep inside the block 1 making the impregnation process fail.

The resin must be suitably coloured so that the repair is scarcely visible or not visible at all in the plates and manufactures that will afterwards be produced: in order to do so, a batching device for the concentrated colour diluted with resin is inserted inside the resin flow for the whole length of the resin insertion step in percentage volumetric or weight proportions.

The resin poured on the block 1 starts flowing into the most open fractures and in the interface between external tight wall formed by sheet 4 and block 1 in order to also reach the interspace between tight base 2 and block 1, always preserving a liquid head above the block 1 that is sufficient to fill all defects of block 1 in the following steps.

Afterwards, the autoclave is made communicate with the outside and the incoming air starts operating as a piston on the fluid resin surface on the block 1 in the containment basin that is perimetrally formed by the sheet 4, forcing it to penetrate inside the block 1, with an available differential of about 1 kg/cm$^2$ between outside and outside the block 1.

After having restored the atmospheric pressure inside the autoclave, a positive pressure is introduced to force the resin also into the microcracks of the block 1.

The overpressure value can be modified according to the stone being treated from a minimum of 0.5 atmospheres to 5 atmospheres or more, taking into account that the smallest the crack to be consolidated is, the stronger the required pressure is to reach it and fill it with resin.

After having left the autoclave in overpressure for the necessary time for the pressure to force the resin into the cracks and structural discontinuities of the block 1, overcoming the resistances encountered by the resin to be inserted, the atmospheric pressure is reinstated into the autoclave and the autoclave itself can be opened to remove the block 1.

According to the type of plant being used, the flow rate and type of pumps to create vacuum, the way of inserting the resins into the autoclave, the technique used to insert the overpressure and the overpressure level, the type of resin being used, the stone to be treated and the size of the block 1, the whole impregnation cycle in autoclave can be 30–60 minutes long, thereby guaranteeing a meaningful productivity for the plant.

After having removed the block 1 from the autoclave, the resin is left to harden naturally or its hardening is induced through systems that are related to the type of used resin. With single-component or double-component resins of the epoxy or polyurethane type, for example, hardening can be accelerated by heating block 1, while other resins can be activated to harden, for example, with ultraviolet rays.

When hardening has occurred, the block 1 is freed from the structures being used for the method and is ready to be sawed.

The above-described method is simple, uses for liquid- and gas-tightening a sheath that extends from the block base to the vertical perimeter with the minimum possible number of joints, does not provide for glueings between block 1 and sheath, uses rigid support structures for containing the hydrostatic thrusts exerted by the resin, such structures being eventually lightweight and easily handled, but without giving them any function of liquid- and gas-seal and thereby avoiding the cumbersome assemblies and disassemblies, cleanings and gasket replacement that a rigid formwork with variable geometry would imply, and leaves for the block 1 the task of resisting to the strong pressures from the outside towards the inside that occur when the block 1 into the autoclave is subjected to re-balancing with the atmospheric pressure or is affected by overpressures inserted into the autoclave.

Moreover, the replaceable components are inexpensive, the resin consumption per volume unit being treated is reduced th a minimum compatible with the complete filling of the structural block discontinuities, the cycle operations are simple and without uncertain results, the cycle operation times are short and the method is economically feasible as a result.

The method of the invention also provides for the fact that the consumption of impregnation resins is limited by a structure (not shown) that is placed above the block 1 after having ended its assembling: this structure is composed of a material whose specific weight is greater than the specific weight of the resin and globally heavy enough to win the hydrostatic resin thrust and is built with a sufficient thickness so that the resin cannot cover it on the top; moreover, the structure is built of a material to which the resin cannot stick on or is coated with a paint or another protection to which the resin cannot stick on, the structure as a whole being formed by a central square or rectangular part, where this central part is able to be accurately lifted and transported onto the block through hooking means on connections, by possible additional longitudinal, transverse and angular prostheses, in order to cover a majority of an upper face of the block 1. This structure is composed in such a way that its lower face in contact with the block is equipped with projections in contact with the upper face of the block 1: such projections are such as to allow a passing channeling for the resin with a very reduced height, and the structure forces the inserted resin to be arranged in thickness equal to many centimeters in a perimeter corridor defined by its plan encumbrance and by a perimeter inside the impermeable sheet that is contained and supported by structural containment panels; the structure is also equipped with a central through-hole and equipped with reference notches for a resin level, these reference notches allowing to visually evaluate said level, through an inspection porthole, and allowing to provide, with a command or a manual action, inserting further resin to avoid that an area of the upper face of the block 1 is uncovered, making air penetrate inside the block and making the impregnation process fail. The resin level check is automatically performed, and consequently the pumping of resin is automatically controlled when the level drops below a safety level, where such level is checked through a floater that activates a proximity switch or equivalent means, and this floater is placed into a central hole, or, to avoid turbulence disturbances, particularly if the resin is inserted from the top, is placed through a second dedicated hole, communicating, next to the upper face of the block 1, with the main center distance hole, possibly used to insert the resin.

What is claimed is:

1. Method for repairing and consolidating a substantially parallelpiped, natural stone block, with internal fractures and structural discontinuities communicating with the at least one of six faces of the block, the method comprising the steps of:

impregnating the block under vacuum in autoclave with a hardening resin, the resin being poured in a liquid state on a free upper surface of the block after having realised the vacuum state, a lower part of the block and a perimeter thereof being contained in a liquid- and gas-tight housing;

preliminarily core-drying the block or heating the block to completely dry the block under vacuum;

inserting the resin into the internal fractures and structural discontinuities through a subsequent application of atmospheric pressure that operates as a piston on the fluid resin arranged in a space formed over the free upper surface of the block, the resin being thereby injected into the internal fractures and structural discontinuities of the block below;

wherein the method provides a coating around the block, the coating wrapping the block below and along a vertical perimeter thereof and being higher than the block, the coating being spaced from the block with suitable spacers, the spacers being also in the form of a resin-flow permeable fabric, the coating being adapted to form the liquid- and gas-tight housing and to allow the resin to flow against the block, elements composing said coating being mutually connected through a tight seam;

and wherein a containment of hydrostatic resin pressures operating from inside the block towards outside the block and a control of resin consumptions are performed by an external formwork composed of the coating held in position by sturdy structures, the structures being secured by screwing or other securing means to a platform for supporting and transporting the block.

2. Method for repairing and consolidating a natural stone block according to claim 1, comprising the steps of:

preparing the block with possible re-quadrature operations and rebuilding, with preferred fillers, angles and other areas where surfaces of the block show holes and valleys;

perfectly drying the block to its core;

placing the block on a rigid and planar platform adapted to support and transport the block, the platform being equipped with threaded holes or equivalent mechanical sealing or magnetic sealing means, by interposing a liquid- and gas-tight base sheet also when a pressure exerted against an external face of the sheet is greater by a few atmospheres than the pressure exerted against an upper face of the sheet towards the block, the base sheet having sizes that are greater than the sizes of the plan base of the block, on the base sheet discontinuous spacers or a fabric being placed, such spacers or fabric allowing an easy resin sliding between the upper face of the base sheet and the base of the block;

applying on the whole vertical perimeter of the block one or more continuous woven or non-woven textile sheets, the textile sheets being higher than the block and allowing an easy resin now, particularly along a vertical direction;

applying on the perimeter of the block outside the textile sheet a liquid-and gas-tight vertical sheet also when the pressure exerted against an external face of the textile sheet is greater by a few atmospheres than the pressure exerted against an internal face of the sheet towards the block, the vertical sheet being higher than the block in order to form an upper containment basin for the resin, the vertical sheet being stretched at two end edges thereof in order to adhere to the perimeter of the block before being joined through welding or any other type of connection adapted to provide a liquid- and gas-tight joint;

connecting with the seam, made of structural liquid- and gas-tight glue, the vertical sheet to the base sheet;

arranging around the block a plurality of rigid supports, the rigid supports being pushed against the coating comprising the vertical sheet and being anchored to the rigid platform through securing means screwed into the threaded holes, the rigid supports being mutually arranged at a distance that is computed in order to guarantee the seal to hydrostatic resin pressure operating from inside the block, without the vertical sheet being torn away or being excessively deformed, increasing the resin consumption;

inserting the block into the autoclave and creating vacuum;

pouring the resin onto the upper face of the block that has been previously put in register, accumulating a sufficient amount of resin that guarantees a filling of internal fractures and structural discontinuities of the block, avoiding the surface of the block from projecting and making air going into the block, thereby making the consolidation fail;

removing vacuum from the autoclave taking care that the resin that started to freely flow into side channels and fractures of the block is forced to enter into the internal fractures and structural discontinuities by a pressure on the order of 1 $kg/cm^2$;

putting again the autoclave interior in communication with the outside to re-establish the atmospheric pressure;

opening the autoclave in order to remove the block and to let the resin harden or to induce the resin hardening through other means;

freeing the block from the formwork and making it available for subsequent sectioning operations into plates.

3. Method for repairing and consolidating a natural stone block according to claim 2, wherein at least one of the base sheet and the vertical sheet comprise a composite sheet with two or more layers of plastic materials or metals, such layers being mutually joined so that the composite sheet is more resistant and less extensible and that a possible the or failure in one of the layer does not impair the liquid- and gas-tightness.

4. Method for repairing and consolidating a natural stone block according to claim 2, wherein the seal to hydrostatic resin pressure is guaranteed on long sides of the block by first rigid and light structures secured against the block by at least two rigid supports placed and fixed to the rigid platform outside the maximum width of the block that can be processed, and on short sides of the block by second rigid and light structures whose width is less than the width of the block and that are secured by at least two rigid supports to the two longitudinal ends of the rigid platform inside the first structures, the size of the second structures being such as to minimise the side areas in which the hydrostatic pressure must be supported by the vertical sheet only.

5. Method for repairing and consolidating a natural stone block according to claim 2, wherein the drying process is enabled by a simple heating of the block to about 20° C. inside, without a need of performing a preliminary complete drying, the drying to the core being performed by the vacuum state that reduces the water vapor tension to progressively decreasing values, the heating of the block providing the thermal mass that prevents the cooling following the quick evaporation from transforming water into ice.

6. Method for repairing and consolidating a natural stone block according to claim 5, wherein the drying process is accelerated by the presence in the surge tank of a cooled body on which water is deposited in the form of ice.

7. Method for repairing and consolidating a natural stone block according to claim 2, wherein the resin, having been previously degassed, is inserted at the base of the block and is made rise through the surface to enable the residual air contained in the block to exit the block, taking care of forming a liquid head on the surface of the block.

8. Method for repairing and consolidating a natural stone block according to claim 2, wherein after having re-established the atmospheric pressure, an overpressure from 0.5 to 5 kg/cm$^2$ or more is introduced into the autoclave in order to force the resin further into the Internal fractures and structural discontinuities of the block (1).

9. Method for repairing and consolidating a natural stone block according to claim 2, wherein the resin is loaded with at least one of colours and pigments to make repairs more chromatically suitable for the material.

10. Method for repairing and consolidating a natural stone block according to claim 1, wherein the block is impregnated in a normal position to a following sawing plane in plates with a multi-blade frame, the block being placed below the frame turned by 90° with respect to a position in which the block was impregnated thereby avoiding the frame from cutting upper and lower continuous resin layers and obtaining plates that will be reinforced on all their perimeter by a protection belt against handling impacts.

11. Method for repairing and consolidating a natural stone block according to claim 1, wherein a consumption of impregnation resins is limited by a channeling structure that is placed above the block, the channeling structure being composed of a material whose specific weight is greater than the specific weight of the resin and globally heavy enough to win the hydrostatic resin thrust and being built with a sufficient thickness so that the resin cannot cover it on the top, the channeling structure being built of a material to which the resin cannot stick or being coated with a paint or another protection to which the resin cannot stick, the structure as a whole being formed by a central square or rectangular part, the central part being able to be accurately lifted and transported onto the block through hooking means or connections, by possible additional longitudinal, transverse and angular prostheses, in order to cover a majority of an upper face of the block, the channeling structure being composed in such a way that its lower face in contact with the block is equipped with projections in contact with the upper face of said block, the projections being such as to allow a passing channeling for the resin with a very reduced height, the channeling structure forcing the inserted resin to be arranged in thickness equal to many centimeters in a perimeter corridor defined by its plan encumbrance and by a perimeter inside the impermeable sheet that is contained and supported by structural containment panels, the channeling structure being also equipped with a central through-hole and equipped with reference notches for a resin level, the reference notches allowing to visually evaluate the resin level through an inspection porthole, and allowing to provide, with a command or a manual action, inserting further resin to avoid that an area of the upper face of the block is uncovered, making air penetrate inside the block and making the impregnation process fail.

12. Method according to claim 11, wherein the resin level check is automatically performed, and consequently the pumping of resin is automatically controlled when the level drops below a safety level, such level being checked through a floater that activates a proximity switch or equivalent means, the floater being placed into the central through-hole or through a second dedicated hole, communicating, next the upper face of the block, with the central through-hole, possibly used to insert the resin.

\* \* \* \* \*